(No Model.)
J. PUTNAM.
SLATE PENCIL SHARPENER.
No. 324,787. Patented Aug. 18, 1885.
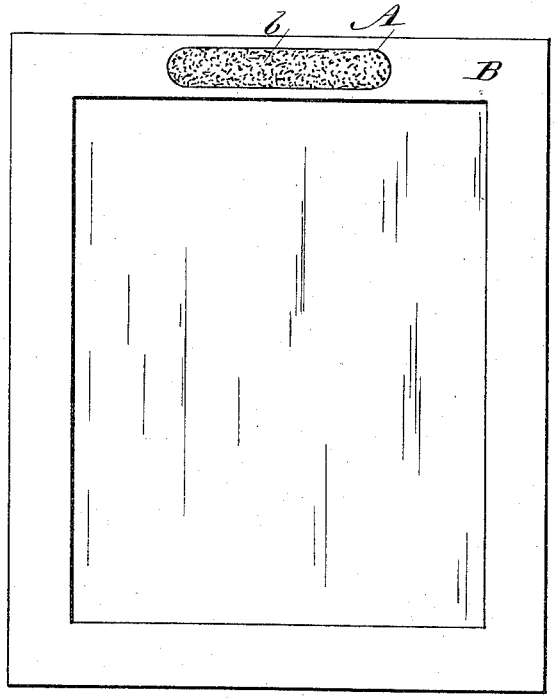
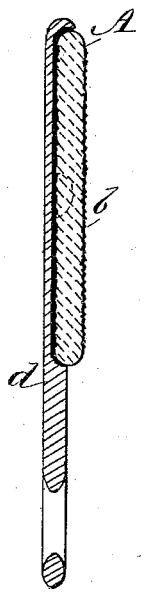
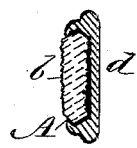
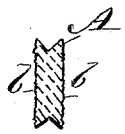
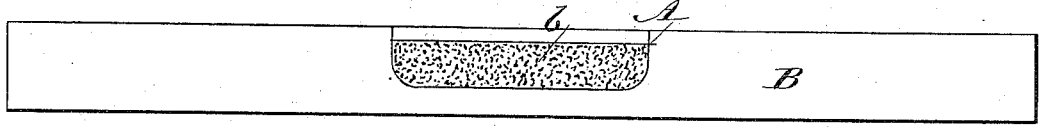
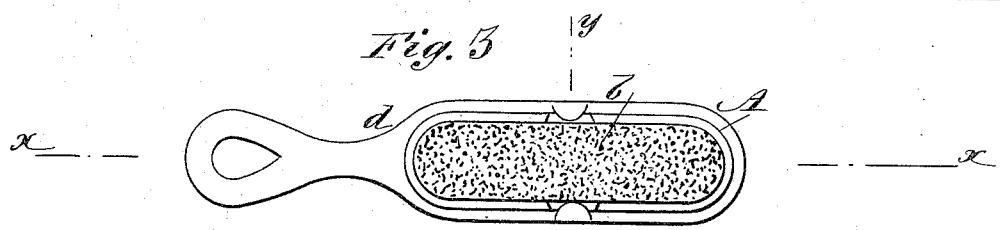
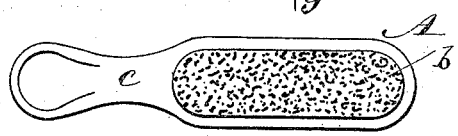
WITNESSES:
C. Neveux
C. Sedgwick
INVENTOR:
J. Putnam
BY Munn & Co.
ATTORNEYS.
N. PETERS. Photo-Lithographer, Washington, D. C.

UNITED STATES PATENT OFFICE.

JOHN PUTNAM, OF PHILADELPHIA, PENNSYLVANIA.

SLATE-PENCIL SHARPENER.

SPECIFICATION forming part of Letters Patent No. 324,787, dated August 18, 1885.

Application filed February 5, 1885. (No model.)

*To all whom it may concern:*

Be it known that I, JOHN PUTNAM, of Philadelphia, in the county of Philadelphia and State of Pennsylvania, have invented a new and Improved Slate-Pencil Sharpener, of which the following is a full, clear, and exact description.

This invention consists in a slate-pencil sharpener made of pressed glass, with its abrading surface or surfaces formed by impression in the mold, the same constituting a virtually indestructible slate-pencil sharpener so far as wear is concerned, and a most efficient one, with special advantages over or as compared with slate-pencil sharpeners made of metal or other material than pressed glass, substantially as hereinafter described.

My improved sharpener is not restricted to any particular size or shape. It may be made with one, two, or more abrading-surfaces, and may either be used separately or be inserted for convenience of use in a slate-frame, "school-companion," desk, or other fixed or movable holder. When made for separate use, it may, if desired, be set in a handle of metal, wood, or any other suitable material, or it may be made with attached handle entirely of glass and all in one piece, or it may be made without a handle. It is formed by pressing glass in a mold as other pressed-glass articles are made, but with one or more surfaces of the mold so roughened as to leave a closely or finely indented corresponding surface or surfaces on the glass, and so that the indentations are bounded by sharp cutting edges or points in close proximity to each other, resembling what might be termed a "sand-paper finish." In this way I avail myself of the sharpening property which is found only in the outside surface of the glass, as produced by contact with the mold. The result is that the pencil-sharpener does not absorb moisture, grease, or any other substance, and will not clog or fill with dirt or dust to impair its usefulness, but will be found always clean and remain as first made, if used for slate-pencils only, and consequently be what may be termed "indestructible," with a sharp abrading-surface always at command.

Reference is to be had to the accompanying drawings, forming part of this specification, in which similar letters of reference indicate corresponding parts in all the figures.

Figure 1 represents the one-face view of a slate with my improved sharpener set in its frame; Fig. 2, a similar view of a stick or other article or frame-piece having the sharpener similarly set in it; Fig. 3, a face view of the sharpener set in a metal or other holder constructed to also form a handle; Fig. 4, a longitudinal section of the same on the line $x$ $x$ in Fig. 3, and Fig. 5, a transverse section thereof on the line $y$ $y$ in Fig. 3. Fig. 6 is a face view of the improved sharpener having either one or both of its opposite faces made to present an abrading-surface and constructed to form also a handle integral or of one piece with the body of the article. Fig. 7 is a further face view of the sharpener having opposite abrading-surfaces, but formed without a handle; and Fig. 8, a transverse section thereof on the line $z$ $z$ in Fig. 7.

In each of these figures, A indicates the pressed glass slate-pencil sharpener, and $b$ its abrading surface or surfaces, made as hereinbefore described. When made with an attached handle, $c$, which forms an integral portion of it, as in Fig. 6, said handle is also formed by pressure in the mold. When made without a handle and set in a slate or other frame-piece, B, as in Figs. 1 and 2, the sharpener may be secured in its place by cement or any other suitable means, and when set in a separate holder, $d$, constructed to also form a handle, as in Figs. 3, 4, and 5, it may be secured in place by clamping-lips or otherwise.

To use the sharpener, the slate-pencil is rubbed backward and forward transversely to its length over the roughened or granular abrading-surface of the sharpener and turned or rolled over from time to time, so as to present different portions or sides of it to the abrading-surface in order to give the necessary point to the pencil.

The advantages of my sharpener over those formed of metal are as follows: First, it is indestructible, on account of its hard outer abrading-surface—formed by pressing the glass in the molds—when used for the purpose claimed, while a metal or file sharpener will soon be worn out by contact with slate, as I have proved by experiment; second, it does not clog or fill up, as would an ordinary file, from the grease and moisture on the fingers of the child using it; third, it will not rust, and hence it can be exposed to the air, washed, or carried in the pocket without being damaged; fourth, by "pressing" the sharpener an outer hard surface is formed which is similar to "case-hardening" in metal-working; fifth, it is much lighter than the files commonly used, and will not cut through the child's pocket, as would said files.

Having thus described my invention, what I claim as new, and desire to secure by Letters Patent, is—

1. As a new article of manufacture, a pressed-glass slate-pencil sharpener having one or more pressed abrading-surfaces, substantially as specified.

2. A pressed-glass slate-pencil sharpener having one or more pressed abrading-surfaces and provided with a handle, essentially as described.

JOHN PUTNAM.

Witnesses:
ORMOND RAMBO,
CHAS. S. LEE.